United States Patent Office 2,693,458
Patented Nov. 2, 1954

2,693,458

CHROMIUM COMPLEXES OF FLUOROCARBON ACIDS

Maynard H. Olson, St. Paul, Minn., assignor to Minnesota Mining & Manufacturing Company, St. Paul, Minn., a corporation of Delaware No Drawing. Application July 18, 1952, Serial No. 299,727

12 Claims. (Cl. 260—2)

This invention relates to my discovery of a new class of chromium-containing fluorocarbon compounds, and polymers thereof, having novel and useful properties; and to materials which have been treated therewith so as to possess novel and useful surface properties. The polymers have a combination of water-repellency and oil-repellency, resistance to acids, bases, reducing agents and oxidizing agents, thermal stability, and high electrical resistivity even at high humidities.

These new compounds are green-colored, tacky, liquid Werner-type coordination complexes of trivalent chromium and perfluoroalkyl monocarboxylic acids (normal and branched) that contain from 4 to 12 carbon atoms per acid molecule. These acids are fully fluorinated and have the generic formula $C_nF_{2n+1}COOH$, where $n$ has a value of 3 to 11. These complexes contain chromium in its trivalent form and they contain two perfluoro acido groups bonded to each chromium atom. They contain no chlorine. The complexes and their polymers are very insoluble in water. They contain more than 50% by weight of chemically combined (carbon-bonded) fluorine. The invention also embraces the ammoniated derivatives of these complexes and polymers.

Both the unammoniated and the ammoniated forms of the complexes can be heated to produce solid materials that are both water-repellent and oil-repellent (i. e., both hydrophobic and oleophobic), and that are insoluble in common non-polar organic solvents. The complexes can be employed (either directly or in solution) for coating and impregnating a wide variety of materials and, upon heating, the substrate is provided with a coating that is both hydrophobic and oleophobic. This combination of hydrophobic and oleophobic properties is due to the presence of fluorocarbon chains which contain at least three fluorinated carbon atoms. The heat-advanced solid products can be dissolved in suitable solvents and applied in solution form, evaporation of the solvent then leaving a solid coating.

The unammoniated liquid complex can be polymerized by heating to provide a solid, non-tacky, non-thermoplastic, heat-stable material that is insoluble in non-fluorinated solvents, both polar and non-polar, but which is soluble in highly fluorinated solvents. Self-sustaining flexible films and sheets, flexible coatings, and other products, can be made.

These Werner-type complexes are quite different from the ordinary trivalent-chromium salts of the acids, which are solids and contain three perfluoro acid groups per chromium atom.

The present class of complexes is to be distinguished from those that are made by reacting chromyl chloride ($CrO_2Cl_2$) with a fluorocarbon acid in an inert anhydrous solvent vehicle (such as carbon tetrachloride), in the presence of a reducing agent (such as anhydrous methanol), and evaporating the reaction mixture to remove volatiles. Such complexes and their polymers may contain two chromium atoms for each acido group. The complexes are green solid materials that are slightly soluble in water (sufficiently so for coating purposes) and are highly soluble in methanol and acetone. They contain chlorine. They can be heated in the presence of water to form water-repellent polymers, but HCl is released, which is sometimes disadvantageous when treating textile materials. Chromium complexes of that type are described and claimed in the copending application of T. S. Reid, Ser. No. 219,749, filed April 6, 1951, now U. S. Patent No. 2,662,835.

In accordance with the present invention, the original unammoniated chromium complexes are formed by the reaction, in a system containing a hydroxylated compound, of a reactive compound containing trivalent chromium and containing no chlorine, and a perfluoroalkyl monocarboxylic acid that has from 4 to 12 carbon atoms in the molecule.

For example, the chromium complexes can be conveniently made by reacting together, in a 1:2 molar ratio, chromium trioxide ($CrO_3$), which contains chromium in the hexavalent state, and a perfluoroalkyl monocarboxylic acid ($C_nF_{2n+1}COOH$) that has 4 to 12 carbon atoms in the molecule, in an aqueous reaction medium containing a reducing agent (such as methanol or isopropanol). The reducing agent reduces the chromium from a hexavalent to a trivalent state, and the reaction with the acid is effected with a reactive compound containing trivalent chromium. The use of an aqueous medium is greatly preferred for two major reasons: it reduces the fire hazard (chromium trioxide being a powerful oxidizing agent), and it causes the chromium-acid reaction product complex to precipitate out from the solution so that it can settle to form an immiscible lower layer which can easily be separated out and recovered in mechanical fashion. Heating is preferably employed to hasten the reaction and to minimize the effect to competitive side reactions.

The chromium-complex reaction product is not a simple compound but is a liquid mixture of unpolymerized chromium-complex molecules (monomers) and polymerized molecules formed therefrom. Continued heating advances the extent of polymerization and changes the physical properties. During the initial period, the complex has a high solvent action for the perfluoro acid reactant and the reaction product contains dissolved acid in addition to the chemically bound perfluoro acido groups. As the reaction progresses (involving polymerization) the dissolved acid is released and reacts with the chromium trioxide to form fresh reaction-product complex. The reaction goes to completion to produce a reaction product of exactly 2 moles of acid for each mole of chromium trioxide, the product containing 2 perfluoro acido groups for each chromium atom, the latter being in the trivalent state. Analytical evidence indicates that each monomeric molecule may contain a covalently linked hydroxyl group and a coordinatively linked water and/or alcohol molecule (depending on the reaction medium).

Regardless of theory as to structure, the chromium-acid reaction product complex can be objectively defined as containing two perfluoro acido groups per chromium atom and as being a green-colored, water-insoluble, tacky, viscous liquid. It is thusly differentiated from the more highly polymerized end product which is a green-colored, water-insoluble, non-tacky, flexible, solid material. The latter will hereafter be referred to as the solid polymer or polymer product of the complex; the "complex" being the tacky liquid reaction product.

The initially formed water-insoluble complex is soluble in methanol (methyl alcohol) and other alcohols, acetone and other ketones, ethyl acetate and other esters, formalin, and is sparingly soluble in diethyl ether. It is not soluble in nonpolar solvents, such as carbon tetrachloride, heptane and benzene. This initial type of product is of limited value since it contains dissolved acid which cannot easily be removed. The acid can be eliminated by heating but such heating advances the complex to a different state. If this initial acid-containing complex is recovered and used as such for providing coatings, which are set up to a solid state by heating, the dissolved acid will be wasted.

Further heating of the complex in the reaction vessel advances it to a methanol-insoluble state, eliminates the dissolved acid, and increases its viscosity. At this point the complex is considered to be in its "final" and most useful state. Although insoluble in normal (straight chain) alcohols, and sparingly soluble or insoluble in acetone, it is moderately and completely soluble in isopropanol (isopropyl alcohol), and solutions in the latter can be used for coating and impregnation purposes.

Still further heating of the liquid complex gradually destroys solubility even in isopropanol, that is, an increasingly large fraction of the material becomes insoluble in isopropanol owing to polymerization. However, the product remains in a tacky liquid state, becoming increasingly viscid. This viscid product becomes entirely isopropanol-insoluble before turning into the ultimate non-tacky solid polymer product.

All of these methanol-insoluble liquid complexes are soluble in highly fluorinated solvents. Examples of the latter are the fluorocarbons (carbon fluorides), the perfluoro aliphatic tertiary amines, and the perfluoro aliphatic and cyclic ethers. They are also soluble in "Freon 12" (dichlorodifluoromethane) and in "Freon 113" (trifluorotrichloroethane).

All of these liquid complexes will slowly but spontaneously polymerize to the solid state at room temperature. Heating at 100° C. or higher results in speedy polymerization (e. g., the isopropanol-soluble complex will substantially fully polymerize in 10 minutes at 130° C.). Solutions of the complexes can be used for coating or impregnating, or casting films, followed by heating to remove residual solvent and form the solid polymer product.

The ultimate solid polymer product is a non-tacky, transparent, green-colored, non-thermoplastic, flexible material, adapted to provide non-tacky films and surface coatings having a unique combination of useful properties. This solid polymer may contain less than a precisely 2:1 ratio of acido groups to chromium atoms. The polymer will stand prolonged heating without softening or decomposing. For instance, a sample film has been heated for 100 hours at 210° C. without softening or visible decomposition. However, some change did take place as shown by loss of weight, change in X-ray pattern, and slight embrittlement. In another experiment, a film was heated on a brass block to a temperature of 380° C. without appreciable softening or decomposition. This thermal stability is of great value in respect to coatings and films used as insulation in electrical devices, such as motors and transformers, which can be designed to operate at high temperatures. The polymer is insoluble in water and in all common organic solvents; but it is soluble in highly fluorinated solvents and can be coated from solutions therein. When the polymer is dissolved in a volatile perfluoro solvent (for instance, $c$-$C_8F_{16}O$), or in "Freon 113," any amount of "Freon 12" can be dissolved therein without loss of miscibility; and such solutions can be employed in aerosol bomb type applicators for coating surfaces with the polymer. The liquid complexes can be employed in aerosol bomb type applicators for coating on surfaces, followed by polymerization in situ.

Flexible self-sustaining polymer films can be made. Despite its green color in bulk, thin coatings can be provided which produce no apparent coloration of the coated material. Polymers of complexes that have been made using methanol as the reducing agent, are highly resistant to acids and bases and to oxidizing agents and reducing agents, and have a high degree of stability to chemical and thermal decomposition. They are resistant to hot concentrated nitric acid but not to hot sulfuric acid. The polymers are transparent and have low refractive indices, which is of interest in respect to coatings and films were a low refractive index is desirable for optical reasons. Thus the polymer of the complex made from perfluorocaprylic acid has a refractive index of approximately 1.34. The polymers have a high electrical resistivity even at high humidities, which is of interest in respect to coating electrical insulators, spark plugs, etc., and in providing insulating coatings on wires and other electrical conductors. They are non-polar in nature and have a low dielectric constant.

One of the most outstanding and valuable properties of these polymers and of coatings thereof is the combination of water-repellency and oil-repellency (i. e. they are both hydrophobic and oleophobic). Continuous films have a low water-vapor permeability. Coatings are substantially as water-repellent as those provided by the best of the water-repellent coating agents heretofore on the market. The latter are not oil-repellent and are easily wetted by hydrocarbon oils and greases. The present polymers can be employed in much lower coating weights than hydrocarbon-type materials to obtain optimum water-repellency. In the prior art of waterproofing, it has been taken for granted that a hydrophobic characteristic is only obtainable in consequence of the presence of molecular groups that are not repellent to hydrocarbons and which may even have a strong affinity thereto. The most strongly hydrophobic coatings have been readily wet by hydrocarbons. Conversely, in the art of oilproofing and greaseproofing it has been assumed that an oleophobic characteristic is only obtainable in consequence of the presence of molecular groups that are not repellent to water and which may even have a strong affinity thereto. The most strongly oleophobic coatings have been readily wet by water.

Fabrics and paper treated with the present polymers, even when the coating weight is so low that no coloration and no stiffened "handle" is imparted, are remarkably impervious to both water-base and oil-base stains. Coffee, blood, ink, berry juice, cooking grease, motor oil, etc., can be blotted off, leaving little or no stain. They shed water like a duck's back but, unlike a duck's back, they also shed oil. An illustrative use is in treating neckties so as to render them resistant to staining due to dribbling of soup, gravy, coffee, fruit and vegetable juices, etc.—a real boon to many men and their wives. The foreign material can be easily blotted off with a paper or cloth napkin or handkerchief. Another important feature is that the present complexes contain no chlorine and there is no evolution of HCl to contend with in setting-up coatings thereof, contrary to the case with various chlorine-containing waterproofing agents now on the market which must be used in a somewhat complicated and in a carefully controlled manner to minimize debilitation of the fibers by hydrochloric acid. Examples of textile materials that have been treated with good results are cotton, wool, silk, and synthetic materials including acetate and viscose rayons, nylon, and "Orlon." The treatment of textile fabrics will be discussed in further detail in a subsequent section.

In addition to treating paper and textile products, the present chromium complexes (and their polymers) can be used generally for the surface treatment or coating of a great variety of materials with advantageous results, including hydrophilic materials such as metal, glass and ceramic products, asbestos, sand and other lithic materials, cellulosic films, wood, cork and leather.

They can be used to provide corrosion-resisting water- and-oil-repellent coatings on metals. Ice formed in contact with such a treated surface has a low adhesion, indicating utility for treating the aluminum surfaces of airplane wings, etc. Glass articles can be treated to provide characteristics which are useful for window panes, windshields, and lenses of electric flashlights, searchlights, automobile and aircraft headlights, taillights, etc. Glass filaments and fibers can be treated to exclude moisture and to provide tough and tightly bonded surface films that protect the glass from abrasion. Glass yarns and the like have the defect that the rubbing together of the glass filaments or fibers causes scratching of the surfaces which destroys the tensile strength of the scratched filaments or fibers.

Fabrics and papers impregnated with the present polymers, and self-sustaining polymer films, can be employed as oil-proof and water-proof gasket materials that are heat-resistant and chemically inert.

Metal, fiberboard, paper and glass containers can be coated on the inside to provide protection against materials shipped therein and in some cases to facilitate complete emptying due to the inner surface being non-wettable by the aqueous or non-aqueous contents, as, for example, lubricating oils, medicinals, etc. For instance, a glass bottle was provided on the inside with a polymer coating having a thickness of about $10^{-4}$ cm. and the bottle was filled with a viscous mineral oil, with the result that the oil could be poured out without leaving a residue, owing to the non-wetting of the treated glass surface.

The present complexes are also useful in providing primer coatings on glass, metal and other surfaces, which provide a better anchorage for subsequently applied fluorocarbon polymer coatings, owing to the fluorocarbon characteristic of the surface of such primer coatings. The best interbonding with the subsequent coating is obtained when the primer coating is fully cured after application of the further coating.

Isopropanol solutions of the present complexes have been blended with a variety of lacquers and enamels with the result that the ultimate coatings have acquired a combination of water-repellency and oil-repellency. For example, a melamine type enamel used for coating refrigerators was modified by incorporating an isopropanol solution of the complex of perfluorocaprylic acid, and ethyl acetate as a blending agent, and was then coated on metal and heated to evaporate the solvents, polymerize the complex, and cure the enamel. The resultant enamel coating was both water-repellent and oil-repellent. The weight percent of the complex (dry solids basis) was less than 1%.

*Ammoniated complexes and polymers*

The previously-described unammoniated liquid chromium-perfluoroacid complexes can be readily ammoniated, either in their liquid state or when dissolved in an anhydrous solvent, such as isopropanol or a fluorinated solvent. The procedure merely involves passing anhydrous gaseous ammonia ($NH_3$) into the liquid until, when ammoniation is completed, there is no further absorption. The ammoniated complex is a solid material normally having a purple color. The progress of the reaction can be followed by the change in color from green to purple. The fully ammoniated complex contains two, or possibly three, ammonia molecules for each chromium atom.

These ammoniated complexes are very soluble in isopropanol, and a substantial proportion of water can be added to the isopropanol solution without causing precipitation; the ammoniated complex coming out of true solution as a finely-divided dispersion that remains stably suspended. This aqueous colloidal "solution" can be used for coating and impregnating. The ammoniated complexes are insoluble in highly fluorinated solvents.

The ammoniated complexes release ammonia upon heating, the amount released depending on the temperature and the time. Heating below 95–100° C. does not cause loss of ammonia and results in a free-flowing purplish powder, having a melting point of 95–100° C., which is insoluble in water and in non-polar solvents, but is soluble in alcohol, acetone, ethyl acetate, and the like.

Heating at above 100° C. and below about 180° C. yields a partially ammoniated water-insoluble solid material which is very brittle, purple in color, and very thermoplastic. The product made from perfluorocaprylic acid has a softening point of about 80° C. In appearance and behavior this material when cooled resembles the asphaltic material "Gilsonite." It is soluble in acetone, methanol, isopropanol, ethyl acetate, and the like, but is insoluble in non-polar solvents. It is both hydrophobic and oleophobic.

Heating at a temperature of the order of 180° C. is required for complete deammoniation, and results in a deep-green colored solid that is both water-repellent and oil-repellent, and is soluble in methanol, isopropanol, acetone, ethyl acetate, and the like, but is insoluble in common non-polar solvents. It is waxy and soft at room temperature and is very thermoplastic. It is soluble in highly fluorinated solvents.

Ammoniated polymers can be made by ammoniating the polymers of the unammoniated complexes. This can be done by passing $NH_3$ through a solution of the polymer in a highly fluorinated solvent. Owing to the polymeric state of the material, it may be that only one $NH_3$ molecule is capable of being bonded for each chromium atom.

*Preparation of complexes*

A general description has already been given of the manner of preparing the present complexes and their ammoniated derivatives.

The following is a description of a general procedure that has been employed in making the original unammoniated complexes and is illustrated by reference to the preparation of the chromium complex of perfluorocaprylic acid, $CF_3(CF_2)_6COOH$, an 8-carbon acid containing a chain of seven fully fluorinated carbon atoms united to the carboxyl group.

The apparatus was a 2-liter 3-neck round-bottom glass flask equipped with a motor-driven stirrer, a water-cooled reflux condenser, and a charging funnel. A glass take-off tube having a stopcock was sealed into the bottom of the flask to permit the withdrawal of the liquid product. The flask was surrounded by an electrical heating mantle.

The flask was charged with a solution of 9.12 grams (0.091 mole) of chromium trioxide in 125 ml. of water, which was then warmed to about 60° C. There was then slowly added a solution of 75 grams (0.181 mole) of perfluorocaprylic acid in 60 ml. of methanol, and stirring was immediately started. The temperature was raised to produce refluxing (the boiling point of the solution was about 80° C.). The entire mixture changed from a reddish brown to a deep green color. The green liquid reaction product (chromium-perfluoroacid complex) began to form at once but was not allowed to settle out, being kept in suspension by stirring so as to facilitate the release of acid dissolved therein, the latter reacting with reduced chromium trioxide to form additional reaction product.

All of the acid had reacted with the chromium trioxide by the end of about 20 minutes, representing completion of the reaction thereof in a 2:1 molar ratio of acid to chromium trioxide, the slight excess of chromium trioxide remaining dissolved in the aqueous solution. At this stage the reaction product complex was in its methanol-insoluble state but was completely soluble in isopropanol. Heating and stirring were discontinued and the green liquid product settled to the bottom of the flask as an immiscible layer, which was withdrawn through the take-off tube. This is the final product as ordinarily prepared.

(Continued heating at reflux for a total period of about 30 minutes will advance the degree of polymerization of the liquid product so that it is about ¾ soluble and ¼ insoluble in isopropanol. About one hour or more of heating is required to render the product substantially completely insoluble in isopropanol, but it is then still in a liquid, though highly viscid, state; not yet having become a solid polymer.)

Instead of using methanol as the reducing agent, use can be made of other reducing agents as, for instance, ethanol, isopropanol, polyhydric alcohols (such as glycerine and diethylene glycol), sugar, acetone, formaldehyde, phenol, and hydroquinone. In all such cases both the water and the reducing agent provide hydroxylated compounds in the reaction system. An example of an excellent inorganic reducing agent is sodium bisulfite

($NaHSO_3$)

and, when this is used as the sole reducing agent, the water is the only hydroxylated compound employed. The use of isopropanol as the reducing agent has the advantage of improving the solubility characteristics of the complex, apparently due to the incorporation of isopropanol in the complex. An isopropanol solution of such a complex can be diluted with water in at least a 50:50 ratio without causing precipitation. In contrast, the addition of water to an isopropanol solution of a complex that has been made using methanol, causes immediate precipitation of the complex.

Although the use of an aqueous reaction medium is preferred, it is not essential. The reaction medium can be an anhydrous inert liquid vehicle containing a reducing agent, selected so that the reactants are soluble in the system and the system contains a hydroxylated compound in addition to the acid. Thus the chromium complex has been made by reacting chromium trioxide and the perfluoro acid in carbon tetrachloride containing methanol as the reducing agent. A reducing agent can be employed per se as the solvent vehicle, in which case a liquid hydroxylated reducing agent is used. Thus the chromium complex has been made by reacting chromium trioxide with the perfluoro acid in a vehicle consisting solely of methanol (in this situation the chromium trioxide should be added slowly and very cautiously to a solution of the acid in the methanol to avoid igniting the methanol vapor). In these procedures the chromium-perfluoroacid reaction product does not settle out per se. The reaction mixture can be heated to evaporate the unreacted volatiles, associated with the complex, thereby obtaining the desired green liquid reaction product in isolated form; or the latter can be recovered by a solvent extractive procedure.

It is also possible to use a chromium reactant that already contains chromium in its trivalent form when introduced into the reaction system. For example, chromic acetate, $Cr(C_2H_3O_2)_3 \cdot H_2O$, has been employed as the chromium reactant in a water-methanol (50:50 by volume) system, to which the perfluoro acid was added. Upon boiling for about 20 minutes, there was obtained a green liquid chromium-perfluoro acid complex having substantially the same properties previously mentioned, which was substantially insoluble in methanol but was soluble in isopropanol. This complex was heated to obtain a solid polymer that was both hydrophobic and oleophobic.

Similarly, use has been made of freshly precipitated chromic hydroxide, $Cr(OH)_3$, as a chromium reactant containing trivalent chromium. Ordinary chromic sesquioxide, $Cr_2O_3$, is unsuitable, apparently because of its insoluble and non-colloidal nature which prevents reaction at a practical rate.

Treatment of fabrics

There are two principal methods for impregnating fabrics in accord with the present invention to provide water-repellency and oil-repellency.

The first method utilizes the isopropanol-soluble complexes, either in unammoniated or ammoniated form. The complex is dissolved in isopropanol. The final treating solution preferably contains about 5 to 15 grams of the complex per liter of solution. When using the complex of perfluorocaprylic acid ($C_7F_{15}COOH$) for treating cotton cloth it has been found that the optimum concentration is 7.5–10 grams per liter; the optimum dry weight on the finished cloth being about 0.5 to 1.0%. (When treating cotton cloth a preliminary swelling of the fibers by steaming or kier-boiling is preferred.) The cloth is dipped into the solution and then is passed through rubber squeeze rolls to remove excess solution. The cloth is then oven-dried at 130° C. for 10 to 15 minutes when using the unammoniated complex, or for 15–30 minutes when using the ammoniated complex, to cure the complex to its hydrophobic and oleophobic final form and evaporate the residual solvent. When using the ammoniated type of complex, or the unammoniated type of complex made with the use of isopropanol as the reducing agent, the isopropanol solution can be diluted with at least an equal volume of water. It will be noted that in this procedure the complex is heat-advanced and cured in situ directly on the fibers.

The second method utilizes the preformed or precured hydrophobic and oleophobic product of the complex, dissolved in a fluorinated solvent (such as $c=C_8F_{16}O$), in the same range of concentration noted above for the complex, and this solution is employed for impregnating the cloth. When the partially-deammoniated purple-colored material is employed it can be applied from solution in isopropanol, methanol, acetone or other suitable solvent. The fabric then only requires thorough drying of the solvent, leaving a thin coating on the fibers. This drying operation yields the best results if followed by a short heat cure (e. g., 10 minutes at 130° C.).

Both methods are preferably performed in a closed system and the solvent recovered for re-use.

This treatment produces no noticeable change in color, "hand," flammability, porosity or tensile strength of the cloth.

In experiments performed to evaluate the treatment as applied to a standard white cotton jeans fabric (kier-boiled, 3.7 oz. per square yard, thread count of 96 x 64 per sq. in.), water-repellency values of 26 to 28 were obtained using a variety of complexes and their polymers and the various treating procedures described above. These values are the hydrostatic head values in centimeters as determined by the well-known A. S. T. M. test No. D583–40T (also known as the A. A. T. C. C. hydrostatic pressure test). A value of 28 was obtained for all the polymers of the unammoniated complexes applied by the second method noted above, including the polymer of the complex of heptafluorobutyric acid ($C_3F_7COOH$). These values approximate those obtained in comparison tests using "Quilon" and "Zelan A," well-known waterproofing agents. The critical importance of fluorocarbon chain length was shown when comparison tests were made using the complex of trifluoroacetic acid ($CF_3COOH$) and its polymer, the values being in the range of 10–15, which do not represent significant water-repellency; the fibers being wetted by water.

There is no standard test for the measurement of oil-repellency of fabrics; indicating the uniqueness of this characteristic. The following empirical test, which has been found to yield significant and reproducible results, was employed: The treated fabric specimen is placed on a hard backing support inclined at 60° to the horizontal and a drop of Stanolind Oil (a pure petroleum oil) is placed on the specimen and comparative values are assigned based on the lengths of the run-off patterns. A zero value indicates no run-off, the drop being immediately absorbed. A value of 100 indicates that the entire drop rolls down the incline without leaving any residual trail. The cloth samples treated with the complex of the $C_7F_{15}COOH$ acid (or its polymer) showed a value of 80, the drop of oil running down the slope and leaving a discontinuous trail of spherical droplets which, upon blotting, left no stain on the cloth. Drops of oil placed on such treated cloth when in a horizontal position remained without penetration for indefinitely long periods. The polymers of the complexes of the $C_3F_7COOH$ and $C_5F_9COOH$ acids yielded treated cloths having nearly as high oil-repellency (a value of 70 on the scale employed). In contrast, cloth samples treated with the polymer of the complex of the $CF_3COOH$ acid, and cloth samples treated with "Quilon" and "Zelan A," showed no oil-repellency, the oil being rapidly absorbed and producing a marked stain.

I claim:

1. Chromium coordination complexes of the class consisting of: (A) water-insoluble green-colored tacky liquid complexes formed by the reaction, in an aqueous system, of a chlorine-free reactive compound containing trivalent chromium, and a perfluoroalkyl monocarboxylic acid that has from 4 to 12 carbon atoms in the molecule, these complexes being free from chlorine and containing two perfluoro acido groups for each chromium atom, and being capable of polymerization to a non-tacky solid polymer that is both hydrophobic and oleophobic; and (B) the ammoniated derivatives of the aforesaid complexes.

2. Compositions formed by heating the chromium complexes defined in claim 1 until they are in a hydrophobic and oleophobic solid state.

3. An article that is impregnated or coated with a composition specified in claim 2.

4. Chromium coordination complexes formed by the reaction, in an aqueous system, of a chlorine-free reactive compound containing trivalent chromium, and a perfluoroalkyl monocarboxylic acid that has from 4 to 12 carbon atoms in the molecule, these complexes being free from chlorine and containing two perfluoro acido groups for each chromium atom and being green-colored tacky liquid compositions that are insoluble in water and in methanol but are substantially completely soluble in isopropanol.

5. The ammoniated derivatives of the chromium complexes of claim 4.

6. Ammoniated solid polymers of the chromium complexes of claim 4.

7. Solid polymers of the class consisting of: (A) the non-tacky flexible solid polymers of the chromium complexes of claim 4, which are both hydrophobic and oleophobic; and (B) the ammoniated derivatives thereof.

8. An article that is impregnated or coated with a non-tacky, solid, hydrophobic and oleophobic, polymer of a chromium complex of claim 4.

9. A process which comprises preparing an aqueous solution containing chromium trioxide ($CrO_3$) and a perfluoroalkyl monocarboxylic acid ($C_nF_{2n+1}COOH$) that has from 4 to 12 carbon atoms in the molecule, the molar ratio being approximately 1:2, and which also contains a reducing agent for reducing the chromium to an active trivalent state; heating and mixing the solution until the green-colored liquid chromium-complex reaction product has advanced to a water-insoluble state that is insoluble in methanol but is soluble in isopropanol; and mechanically separating and recovering this product from the aqueous solution.

10. A proecss according to claim 9 wherein methanol is employed as a reducing agent.

11. A process according to claim 9 wherein isopropanol is employed as a reducing agent.

12. A process according to claim 9 wherein sodium bisulfite ($NaHSO_3$) is employed as a reducing agent.

References Cited in the file of this patent

UNITED STATES PATENTS

| Number | Name | Date |
|---|---|---|
| 2,118,772 | Terres et al. | May 24, 1938 |
| 2,273,040 | Iler | Feb. 17, 1942 |
| 2,549,220 | McLaren | Apr. 17, 1951 |
| 2,567,011 | Diesslin et al. | Sept. 4, 1951 |